(12) United States Patent
Potnis et al.

(10) Patent No.: US 12,553,742 B2
(45) Date of Patent: Feb. 17, 2026

(54) METHOD OF LABELING DATA OBTAINED FROM VEHICLE SENSOR

(71) Applicant: Magna Electronics Inc., Auburn Hills, MI (US)

(72) Inventors: Anuj S. Potnis, Hösbach (DE); Muhammad Aizaz Tufail, Ilmenau (DE); Sagar Sheth, Hösbach (DE); Torsten Alexander Bohnet, Frankfurt (DE)

(73) Assignee: Magna Electronics Inc., Auburn Hills, MI (US)

(*) Notice: Subject to any disclaimer, the term of this patent is extended or adjusted under 35 U.S.C. 154(b) by 141 days.

(21) Appl. No.: 18/493,014

(22) Filed: Oct. 24, 2023

(65) Prior Publication Data

US 2024/0142267 A1 May 2, 2024

Related U.S. Application Data

(60) Provisional application No. 63/380,986, filed on Oct. 26, 2022.

(51) Int. Cl.
*G01C 21/00* (2006.01)

(52) U.S. Cl.
CPC ..... *G01C 21/3889* (2020.08); *G01C 21/3815* (2020.08); *G01C 21/3841* (2020.08); *G01C 21/3848* (2020.08)

(58) Field of Classification Search
None
See application file for complete search history.

(56) References Cited

U.S. PATENT DOCUMENTS

| | | | |
|---|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,925,980 B2 | 3/2018 | Edo-Ros |
| 10,043,091 B2 | 8/2018 | Singh et al. |
| 10,071,687 B2 | 9/2018 | Ihlenburg et al. |
| 10,099,614 B2 | 10/2018 | Diessner |

(Continued)

FOREIGN PATENT DOCUMENTS

CN 114860800 A * 8/2022 ............. G07C 5/008

*Primary Examiner* — Todd Melton
(74) *Attorney, Agent, or Firm* — HONIGMAN LLP

(57) ABSTRACT

A method for labeling vehicular sensor data includes accessing sensor data captured by a plurality of sensors disposed at a vehicle. The method also includes accessing global positioning system (GPS) sensor data of the vehicle. For each time step of a plurality of time steps associated with the sensor data, vehicle position information is extracted from the GPS sensor data that represents a respective geographic location of the vehicle at the respective time step. For each time step of the plurality of time steps of the recording of sensor data, respective location-based information associated with the respective geographic location of the vehicle at the respective time step is obtained from a database. For each time step of the plurality of time steps of the recording of sensor data, the recording of sensor data at the respective time step is labeled using the respective obtained location-based information.

21 Claims, 2 Drawing Sheets

(56) References Cited

U.S. PATENT DOCUMENTS

| | | | |
|---|---|---|---|
| 10,532,698 B2 | 1/2020 | Potnis et al. | |
| 10,755,284 B2* | 8/2020 | Simpson | G06Q 30/018 |
| 10,861,189 B2 | 12/2020 | Potnis | |
| 10,909,392 B1* | 2/2021 | Chaudhuri | G05D 1/0214 |
| 11,068,918 B2 | 7/2021 | Smid et al. | |
| 11,119,480 B2 | 9/2021 | Potnis et al. | |
| 11,428,537 B2* | 8/2022 | Lavy | G06V 20/56 |
| 11,620,522 B2 | 4/2023 | Potnis | |
| 11,745,749 B2 | 9/2023 | Potnis | |
| 11,994,394 B2* | 5/2024 | Zhang | G01C 21/005 |
| 12,106,583 B2 | 10/2024 | Potnis | |
| 2011/0264662 A1* | 10/2011 | Umezu | G06F 16/907 |
| | | | 707/E17.089 |
| 2023/0274590 A1 | 8/2023 | Sheth et al. | |
| 2023/0343148 A1* | 10/2023 | Xiao | G06Q 50/01 |
| 2023/0349717 A1* | 11/2023 | Zhang | G06F 16/29 |
| 2023/0384122 A1* | 11/2023 | Kim | B60W 60/001 |
| 2024/0137473 A1 | 4/2024 | Potnis et al. | |
| 2024/0144658 A1 | 5/2024 | Potnis | |
| 2024/0370360 A1* | 11/2024 | Chandler | G06N 5/013 |
| 2025/0061734 A1 | 2/2025 | Potnis et al. | |

\* cited by examiner

METHOD OF LABELING DATA OBTAINED FROM VEHICLE SENSOR

CROSS REFERENCE TO RELATED APPLICATION

The present application claims the filing benefits of U.S. provisional application Ser. No. 63/380,986, filed Oct. 26, 2022, which is hereby incorporated herein by reference in its entirety.

FIELD OF THE INVENTION

The present invention relates generally to a vehicle sensing system for a vehicle and, more particularly, to a vehicle sensing system that utilizes a plurality of sensors at a vehicle.

BACKGROUND OF THE INVENTION

Modern vehicles are equipped with many sensors that generate a vast quantity of data. Conventionally the captured sensor data is analyzed for events of interest manually, which is an expensive and time consuming process. Use of imaging sensors in vehicle imaging systems on such vehicles is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A method for labeling vehicular sensor data includes accessing sensor data captured by a plurality of sensors disposed at a vehicle. The sensor data is captured by the plurality of sensors while the vehicle is traveling along a road. The method includes accessing global positioning system (GPS) sensor data representing geographic location of the vehicle. A plurality of time steps is associated with the sensor data captured by the plurality of sensors while the vehicle is traveling along the road. For each respective time step of the plurality of time steps associated with the sensor data, the method includes extracting vehicle geographic position information from the GPS sensor data. The vehicle geographic position information represents a respective geographic location of the vehicle at the respective time step. For each time step of the plurality of time steps of the sensor data, the method includes obtaining, from at least one database, respective location-based information associated with the respective geographic location of the vehicle at the respective time step. The method also includes, for each time step of the plurality of time steps of the sensor data, labeling the sensor data at the respective time step using the obtained respective location-based information.

These and other objects, advantages, purposes and features of the present invention will become apparent upon review of the following specification in conjunction with the drawings.

DESCRIPTION OF THE PREFERRED EMBODIMENTS

A vehicle sensing system and/or driver or driving assist system and/or object detection system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
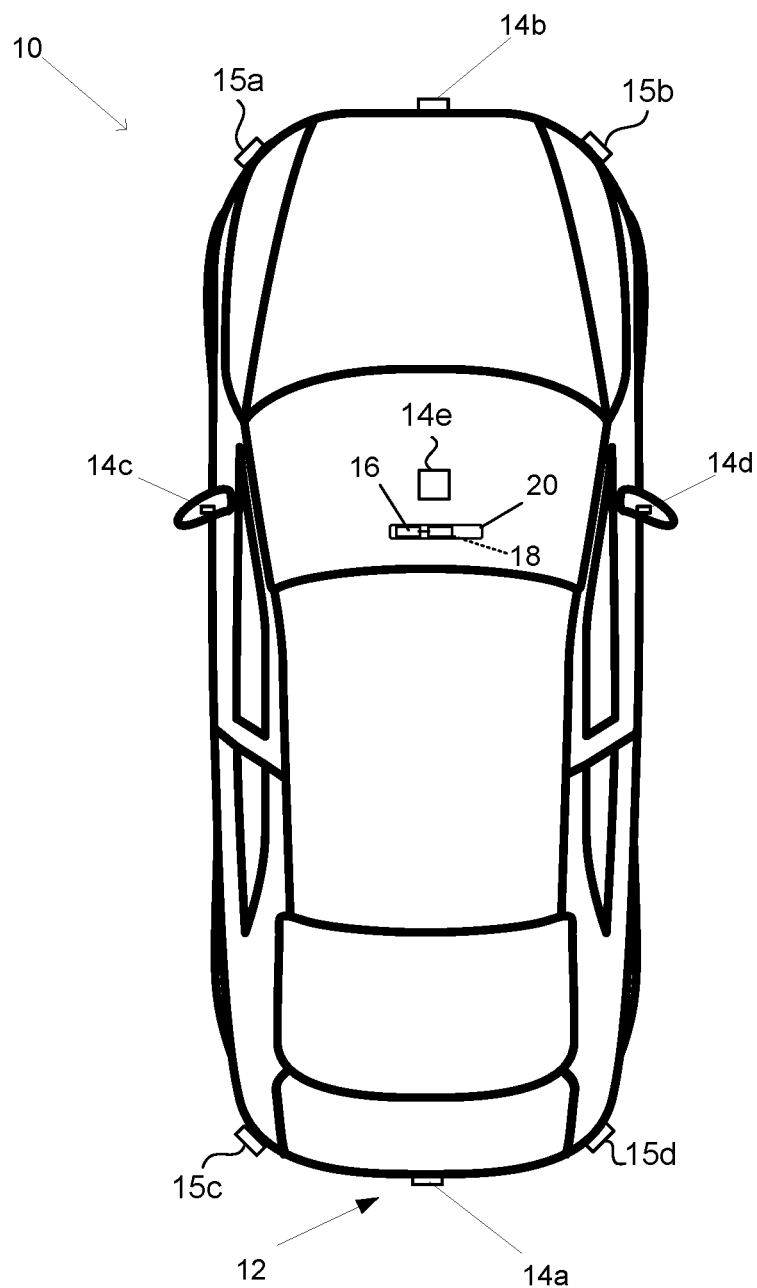
FIG. 1 is a plan view of a vehicle with a sensing system that incorporates cameras.

Referring now to the drawings and the illustrative embodiments depicted therein, a vehicle 10 includes a sensing system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). The sensor system may additionally or alternatively include one or more other imaging and/or non-imaging sensors, such as lidar, radar sensors (e.g., corner radar sensors 15a—d), etc. Optionally, a forward viewing camera 14e may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras (or other sensors, such as radar sensors), whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Large amounts of data collection is generally required for functional performance testing of many modern advanced driver assistance systems (ADAS), such as systems supported by the sensor system of FIG. 1 (e.g., to train machine learning models). Such large amounts of data can create many challenges. For example, it is often challenging to locate events of interest within a large quantity of data. To help mitigate this challenge, the driver or other occupant of the vehicle may be tasked with noting or recording or annotating important event or scenarios (i.e., applying pre-labels) during the data collection process (i.e., as the vehicle is maneuvered around to collect data for testing/validating the ADAS functions). For example, the vehicle may include a touchscreen with user inputs that the occupants of the vehicle may interact with. An occupant of the vehicle may interact with the touchscreen (e.g., by pressing one or more buttons) as events of interest are encountered. For example, an occupant may press a button that corresponds to different environmental conditions such as "day," "highway," "clear sky," "raining," etc. These user inputs may apply corresponding pre-labels to the data being gathered to ease future identification of useful testing data. For example, sensor data such as frames of image data may be annotated with the labels provided by the user, such as a frame of image data being labeled as "cloudy" as the frame of image data was captured during a point in time when the occupant of the vehicle indicated that the conditions were cloudy.

However, this technique has many shortcomings. For example, it may not be easy for an occupant of the vehicle to continuously and accurately press buttons for extended hours. Often, the occupant makes mistakes (e.g., the occupant selects an incorrect user input, such as selecting that the current weather is "cloudy" instead of "sunny"), events are missed (such as the occupant failing to select a user input when an environmental condition changes), events are misunderstood, etc. For example, the driver and/or co-driver or other occupant may neglect to select the appropriate input because of human error such as when the road type changes from highway to city. Moreover, several factors make it expensive to collect data (e.g., geographic location of the testing). Thus, accurate pre-labels are even more important to help determine whether sufficient data has been collected to satisfy all functional and testing requirements.

Implementations herein provide systems and methods for enriching automotive sensor data by applying geoposition (i.e., geographical location information) and time data (i.e., a temporal indication of when the sensor data was acquired) to map, weather, and/or geographic databases. This allows for data mining of automotive sensor data using global positioning sensor (GPS) data, timestamps, map databases, weather databases, etc.

Optionally, the system includes a software tool (e.g., an application executing on data and memory hardware, such as on the vehicle, a user device, or any other computing device) that receives or obtains vehicle data (e.g., sensor data) collected/recorded during operation of the vehicle to test and/or validate one or more ADAS functions. The tool extracts the GPS (e.g., global navigation satellite systems (GNSS)) coordinates from the vehicle data. The tool may also extract timestamps corresponding to these coordinates. The timestamps indicate a point in time when the vehicle was at the corresponding coordinates. This allows the tool to determine the location of the vehicle at different points in time while the vehicle was collecting sensor data. The tool correlates the GPS coordinates and timestamps against one or more databases, such as a map database, a weather database, a sunrise/sunset database, etc. The databases return a variety of information depending on the type of database. For example, the databases return a country, a road type (e.g., highway, city, country road, etc.), presence of roundabouts, presence of ramps, presence of bridges, traffic signs nearby, intersections nearby, environmental conditions (e.g., rain, snow, cloud cover, temperature, day, night, dusk, dawn, etc.), and the like. For instance, the tool correlates the sensor data with a weather database (using the vehicle's location and the timestamps) to automatically determine the weather conditions for the sensor data during at least a portion of the time the sensor data was recorded.

The system may automatically apply the returned information as pre-labels to the vehicle data, allowing the vehicle data to more easily be searched and categorized based on desired events of interest without requiring significant manual intervention (e.g., via an occupant providing input while riding in the vehicle). Continuing the previous example, the tool, using the weather database, may apply a pre-label to sensor data at a first point in time indicating the weather was cloudy at the first point in time and another pre-label to the sensor data at a second point in time indicating the weather was sunny at the second point in time.

The tool may include two modes: a manual mode and an automatic mode. The manual mode allows the user to enter a list of recordings and the tool operates on the listed recordings. That is, in the manual mode, a user provides the tool with previously recorded sensor data (and map data/timestamp data). The tool parses the previously recorded sensor data to apply one or more pre-labels. The user may specify certain pre-labels to apply to the recordings (e.g., weather pre-labels, traffic pre-labels, etc.). In the automatic mode, the tool operates on all recordings as they are provided to the tool in real-time (e.g., as the data is stored in a database the tool has access to). In the automatic mode, the tool may apply a predefined list of pre-labels to the data recordings. The results may be stored in the database along with the data recordings for future re-use.

The tool may be modular and integrate into conventional validation toolchains. For example, the tool may connect to other modules such as a recordings database, GPS extractors, map application program interfaces (APIs), weather APIs, pre-label databases, etc. In some examples, the tool executes on a distributed computing cluster (e.g., "the cloud") and can scale to process thousands of hours of recorded data or more.

Figure 2:
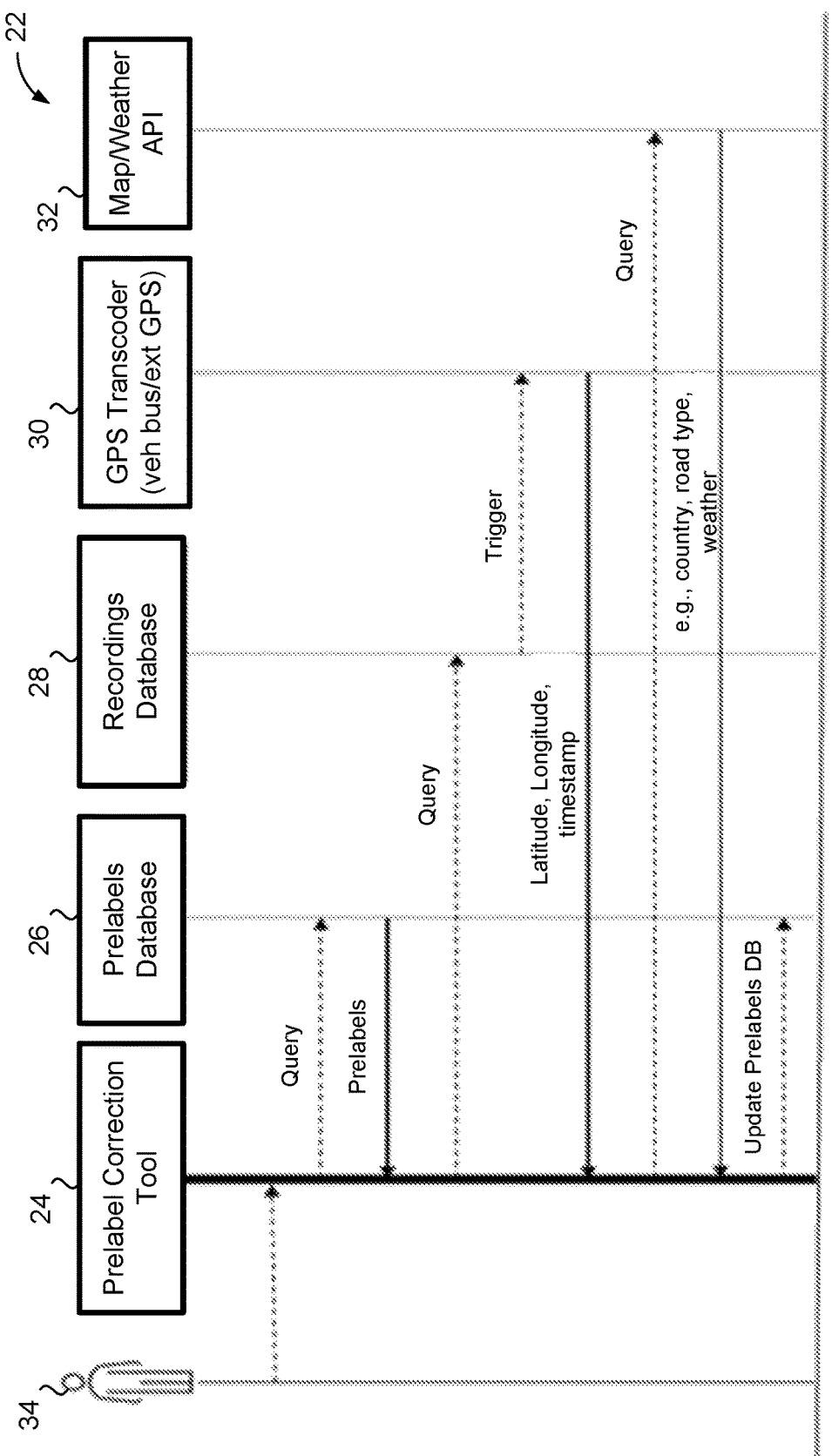
FIG. 2 is a timing diagram of a system for labeling data captured by the sensing system of FIG. 1.

Referring now to FIG. 2, a timing diagram 22 illustrates exemplary communications between a pre-label correction tool 24, a pre-label database 26, a recordings database 28, a GPS transcoder 30 (for extracting GPS location and timestamp information from the recordings), and a map/weather application programming interface (API) 32 for communicating with a corresponding map/weather database. Here, a user 34 may initiate the tool 24, which queries the pre-label database 26 for a set of valid pre-labels (i.e., the pre-labels the tool may apply to the data). The tool 24 queries the recordings database 28 (i.e., to retrieve or access the recordings of the sensor data). The recordings database 28 may be disposed at the vehicle (i.e., on memory hardware disposed at the vehicle as the sensor data is captured). In other examples, the recordings database 28 is remote from the vehicle, such as at a user device or a remote server. Optionally, the recordings data (i.e., the sensor data) of the recordings database 28 is scanned until a trigger condition is satisfied. The trigger condition is satisfied when sensor data from one or more sensors meets one or more configurable thresholds. The trigger condition may indicate a potential event of interest.

When the trigger condition is satisfied (e.g., an object is detected, a braking event occurs, lane markers are detected, etc.), the GPS transcoder extracts GPS location data (i.e., vehicle geographic position information) and timestamp data from the sensor data at or near the point in time the trigger condition was satisfied. That is, the tool 24 determines the vehicle location and time when the trigger condition was satisfied. Using the location data (e.g., latitude and longitude data), the tool queries a map database and/or a weather database (or any other relevant database) to determine one or more pre-labels that correspond to the location indicated by the location data at the point in time indicated by the timestamp (e.g., the road type was a highway and the weather was sunny). The tool 24 may ensure that the pre-labels match the authorized or approved pre-labels indicated by the pre-labels database 26.

The tool may execute on the vehicle in real-time as the data is gathered. In these examples, the tool may be executed by a processor of the vehicle (e.g., an ECU) or by a user device of an occupant of the vehicle that is in communication with the vehicle (e.g., via BLUETOOTH). In other examples, the tool 24 is executed remotely from the vehicle after the data has been collected. In this example, the sensor data is transferred from the vehicle (e.g., via a wireless connection or via a portable storage medium) to a remote computing platform executing the tool 24.

Thus, implementations herein include a tool for labeling large quantities of recorded vehicular data automatically (i.e., without manual labeling). Because conventionally pre-labels are logged by the driver or co-driver at the time of data collection, missed events and other errors are common (e.g., from selecting the wrong user input). To mitigate this, the tool adds/corrects pre-labels with a high level of automation. The tool may query for more pre-labels than initially planned at the time of data collection. For example, at the beginning of a recording session for gathering data related to an automatic emergency brake (AEB) function, roundabouts may be deemed unimportant. However, as the project evolves, false positives may be observed at roundabouts. The tool may extract data relevant to roundabouts (e.g., based on the GPS data associated with the recorded sensor data) to apply appropriate pre-labels even when such a pre-label was not considered during collection of the data.

Traditionally, pre-label correction is accomplished by deploying people to manually sift through vast quantities of data (e.g., watch many hours of video) and correcting the scenarios (i.e., the pre-labels) as errors are discovered. However, this process is expensive, time consuming, and prone to errors. The tool as discussed herein may save a significant number of hours compared to such manual techniques. Moreover, when the tool is integrated into the data collection pipeline, a data collection team can receive early feedback on types of data that have been collected. This allows the team to readjust their data collection strategy in real-time (e.g., before exiting an area, such as a country, where the data collection is being performed). Conventionally, data analysis may not be performed until long after the data has been collected and when it is found that the data is insufficient in some manner (e.g., there is an insufficient distribution of desired events), it may be difficult or even impossible to re-establish the testing parameters (e.g., when a specific country is used for data collection). Thus, the tool may minimize human error while saving significant amounts of effort by efficiently processing large quantities of data. The tool may provide early feedback on data distribution while accurately identifying events of interest. The tool may track, in real-time, the quantity and type of pre-labels applied to the data.

The tool may indicate (e.g., via a notification) when thresholds for certain pre-labels are met. For example, the tool may indicate when a threshold amount of sensor data has had a "sunny weather" pre-label applied. In this way, the tool may allow users to accurately ascertain when sufficient sensor data representing various scenarios and events of interest has been recorded. These thresholds may be configured by the users prior to or during the drive of the vehicle. For example, a user may indicate a first threshold for a "sunny weather" pre-label and a second threshold for a "heavy traffic" pre-label. The tool may indicate to the occupants of the vehicle when the first and/or the second thresholds have been met. The tool may provide statistics in real-time (e.g., counts and types of applied pre-labels), allowing the occupants of the vehicle to direct the vehicle in a manner most conducive to the sensor data needed. The tool may provide a graphical user interface for users to interact with. For example, the tool may utilize aspects of the tool described in U.S. patent application Ser. No. 18/489,152, filed Oct. 18, 2023, which is hereby incorporated herein by reference in its entirety.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331;

6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for labeling vehicular sensor data, the method comprising:
   accessing sensor data captured by a plurality of sensors disposed at a vehicle, wherein the sensor data is captured by the plurality of sensors while the vehicle is traveling along a road;
   accessing global positioning system (GPS) sensor data representing geographic location of the vehicle;
   wherein a plurality of time steps is associated with the sensor data captured by the plurality of sensors while the vehicle is traveling along the road;
   for each respective time step of the plurality of time steps associated with the sensor data, extracting vehicle geographic position information from the GPS sensor data, wherein the vehicle geographic position information represents a respective geographic location of the vehicle at the respective time step;
   for at least one time step of the plurality of time steps of the sensor data, obtaining, from at least one database, respective location-based information associated with the respective geographic location of the vehicle at the respective time step;
   retrieving a manual pre-label associated with the sensor data at the at least one time step of the plurality of time steps, wherein the manual pre-label is provided by an occupant of the vehicle during operation of the vehicle; and
   correcting the manual pre-label by labeling the sensor data associated with the at least one time step of the plurality of time steps using the obtained respective location-based information.

2. The method of claim 1, wherein the at least one database comprises a map database, and wherein the obtained respective location-based information comprises respective map information.

3. The method of claim 2, wherein the respective map information comprises a road type associated with the road at that the respective location.

4. The method of claim 2, wherein the respective map information comprises a traffic condition associated with the road at that the respective location and at that respective time step.

5. The method of claim 1, wherein the at least one database comprises a weather database, and wherein the obtained respective location-based information comprises respective weather information associated with the respective geographic location of the vehicle at the respective time step.

6. The method of claim 5, wherein the label comprises at least one selected from the group consisting of (i) a temperature at the respective location, (ii) a precipitation status at the respective location and (iii) an ambient light level at the respective location.

7. The method of claim 1, wherein labeling the sensor data at associated with the at least one time step of the plurality of time steps using the obtained respective location-based information comprises retrieving a list of potential labels and selecting, from the list of potential labels, a label representative of the obtained respective location-based information.

8. The method of claim 1, wherein each time step of the plurality of time steps is selected based on the sensor data satisfying a trigger condition.

9. The method of claim 1, further comprising storing the label with the sensor data at a database.

10. The method of claim 1, wherein the plurality of sensors comprises a plurality of cameras.

11. The method of claim 1, further comprising, responsive to labeling a threshold number of time steps, generating a notification.

12. The method of claim 1, further comprising recording the sensor data using the plurality of sensors while the plurality of sensors are disposed at the vehicle.

13. The method of claim 1, wherein, via processing of sensor data captured by the plurality of sensors, an event of interest is determined, and wherein at least one time step of the plurality of time steps is associated with the determined event of interest.

14. The method of claim 13, wherein the determined event of interest comprises detection of an object within a path of travel of the vehicle.

15. A method for labeling vehicular sensor data, the method comprising:
   accessing sensor data captured by a plurality of sensors disposed at a vehicle, wherein the sensor data is captured by the plurality of sensors while the vehicle is traveling along a road;
   accessing global positioning system (GPS) sensor data representing geographic location of the vehicle;
   wherein a plurality of time steps is associated with the sensor data captured by the plurality of sensors while the vehicle is traveling along the road;
   for each respective time step of the plurality of time steps associated with the sensor data, extracting vehicle geographic position information from the GPS sensor data, wherein the vehicle geographic position information represents a respective geographic location of the vehicle at the respective time step;

for at least one time step of the plurality of time steps of the sensor data, obtaining (i) respective map information from a map database, wherein the obtained respective map information is associated with the respective geographic location of the vehicle at the respective time step and (ii) respective weather information from a weather database, wherein the obtained respective weather information is associated with the respective geographic location of the vehicle at the respective time step;

retrieving a manual pre-label associated with the sensor data at the at least one time step of the plurality of time steps, wherein the manual pre-label is provided by an occupant of the vehicle during operation of the vehicle; and correcting the manual pre-label by labeling the sensor data associated with the at least one time step of the plurality of time steps using (i) the obtained respective map information and (ii) the obtained respective weather information.

16. The method of claim 15, wherein the obtained respective map information comprises a road type associated with the road at that the respective location.

17. The method of claim 16, wherein the obtained respective map information comprises a traffic condition associated with the road at that the respective location and at that respective time step.

18. The method of claim 15, wherein the label comprises at least one selected from the group consisting of (i) a temperature at the respective location, (ii) a precipitation status at the respective location and (iii) an ambient light level at the respective location.

19. A method for labeling vehicular sensor data, the method comprising:

accessing sensor data captured by a plurality of sensors disposed at a vehicle, wherein the sensor data is captured by the plurality of sensors while the vehicle is traveling along a road, and wherein the plurality of sensors comprises a plurality of cameras;

accessing global positioning system (GPS) sensor data representing geographic location of the vehicle;

wherein a plurality of time steps is associated with the sensor data captured by the plurality of sensors while the vehicle is traveling along the road, and wherein each time step of the plurality of time steps is selected based on the sensor data satisfying a trigger condition;

for each respective time step of the plurality of time steps associated with the sensor data, extracting vehicle geographic position information from the GPS sensor data, wherein the vehicle geographic position information represents a respective geographic location of the vehicle at the respective time step;

for at least one time step of the plurality of time steps of the sensor data, obtaining, from at least one database, respective location-based information associated with the respective geographic location of the vehicle at the respective time step;

retrieving a manual pre-label associated with the sensor data at the at least one time step of the plurality of time steps, wherein the manual pre-label is provided by an occupant of the vehicle during operation of the vehicle; and correcting the manual pre-label by labeling the sensor data associated with the at least one time step of the plurality of time steps using the obtained respective location-based information.

20. The method of claim 19, wherein labeling the sensor data associated with the at least one time step of the plurality of time steps using the obtained respective location-based information comprises retrieving a list of potential labels and selecting, from the list of potential labels, a label representative of the obtained respective location-based information.

21. The method of claim 19, further comprising recording the sensor data using the plurality of sensors while the plurality of sensors are disposed at the vehicle.

* * * * *